United States Patent
Sageman

[11] 3,827,642
[45] Aug. 6, 1974

[54] FEED PARTICULATOR APPARATUS
[76] Inventor: Frank W. Sageman, Priemer Rd., Ubly, Mich. 48475
[22] Filed: Feb. 12, 1973
[21] Appl. No.: 331,649

Related U.S. Application Data
[63] Continuation-in-part of Ser. No. 146,658, May 25, 1971, abandoned.

[52] U.S. Cl............. 241/101.7, 241/222, 241/240, 241/243, 241/294
[51] Int. Cl.............................................. B02c 4/12
[58] Field of Search........... 241/221, 222, 239, 240, 241/242, 243, 190, 195, 292.1, 294, 300.1, 101.7

[56] References Cited
UNITED STATES PATENTS

| | | | |
|---|---|---|---|
| 87,573 | 3/1868 | Lusk | 241/239 |
| 180,626 | 8/1876 | Outcult | 241/195 UX |
| 194,776 | 9/1877 | Hull | 241/222 |
| 681,498 | 8/1906 | Dietrich | 241/190 X |
| 997,684 | 7/1911 | Martin | 241/221 X |
| 1,025,480 | 3/1912 | Pack | 241/190 X |
| 1,884,316 | 10/1932 | Smith | 241/294 |
| 1,936,025 | 11/1933 | Mahaffey | 241/242 X |
| 3,684,196 | 8/1972 | Hankins | 241/240 X |
| 3,762,256 | 10/1973 | Frantz | 241/243 X |

FOREIGN PATENTS OR APPLICATIONS
13,180  6/1934  Australia............................ 241/195

*Primary Examiner*—Granville Y. Custer, Jr.
*Assistant Examiner*—Howard N. Goldberg
*Attorney, Agent, or Firm*—C. Kenneth Bjork

[57] ABSTRACT

The present invention is an improved feed particulator apparatus particularly suitable for use with forage harvesters. These harvesters consist of a gathering unit and feed rolls which feed a material to a cutter unit for chopping or slicing. The present feed paticulator apparatus comprises a cylinder having projecting teeth which cooperates with a curved arcuate member which also can be fitted with projecting teeth. Each tooth has sharp-edged angled ridges on its sides such as are present in a file, e.g., and a notched shoulder at its outer tip. A tapered ridge-containing bar is mounted on the arcuate member between at least two rows of teeth. When used in combination with a forage harvester the present apparatus is positioned rearwardly of the cutter unit of the forage harvester.

8 Claims, 20 Drawing Figures

INVENTOR.
Frank W. Sageman
BY
L. Kenneth Bjork
AGENT

INVENTOR.
Frank W. Sageman
BY
C. Kenneth Bjork
AGENT

FEED PARTICULATOR APPARATUS

CROSS REFERENCE TO RELATED APPLICATION

This application is a continuation-in-part of application Ser. No. 146,658, filed May 25, 1971, now abandoned.

BACKGROUND OF THE INVENTION

In the feeding of livestock, particularly beef steers, to ready these for market, the highest quality meat is realized when the young animals are first range or pasture fed and then finished off under controlled feeding conditions in pens or similar confined quarters. The feeds employed during the finishing operation are designed to provide the maximum in conversion (pounds of feed to pounds of meat) as well as give meat of the highest grades when processed.

A principal source of feed and nutritional values for the finish feeding is particulated grain and hay, particularly cut and chopped corn, other grains, the leafy forage plants alfalfa, clover, and the like. Hereinafter these materials at times all will be referred to as forage.

The use of cut or chopped green or partially dried whole corn, i.e., stalks, leaves and partially or wholly formed cobs, generally referred to as silage, and fresh cut or wilted alfalfa, clover, and the like, generally referred to as haylage, is widespread and these products are staples in the preparation of feeds for the finish feeding of steers for the market and for the general feeding of dairy animals.

Over the past years, mechanical choppers specifically designed for chopping and slicing grains and grasses or the leafy forage crops or grinding grains have been developed and manufactured and are in widespread commercial use. Representative examples of such harvesters are illustrated by U.S. Pat. Nos. 87,573; 194,776; 345,163; 1,443,276; 1,936,025 and 2,060,126. West German Patent 1,045,148 and East German Patent 22,192 also are illustrative.

These are commonly called forage harvesters and will be so designated hereinafter throughout the specification and claims.

In general, the forage harvesters as employed in the preparation of particulated feeds comprise in combination a gathering means, a feed throat or chute, feed means which usually is a feed roller system or conveyer, a fixed cutting bar and rotating reel unit where the reel has a plurality of spaced apart cutting or chopping blades or a flywheel type cutter unit and an exit port. Alternatively, adjacent the reel and cutting bar assembly in certain models is a removable screen to further aid in particulating the feed material. The screen helps to decrease the size of the material being processed in the forage harvester but markedly increases the power requirement as well as tends to cause increased build-up of the partially chopped product in the cutting area, thus restricting the rapid flow of the material through the harvester and causing a reduction in capacity. Also, at the exit port a mechanical transport means, e.g. a screw auger or augers can be located to deliver the chopped feed product to a blower or thrower. These latter members serve to assure that the chopped and sliced forage is removed from the harvester thereby helping to reduce the undesirable buildup in the vicinity of the cutting mechanism. This also serves to provide controlled movement of the chopped and cut forage material to a storage vessel or bin or to other predetermined locations.

Generally, this combination of elements which make up the forage harvester are integrated into a unit having corresponding covers and wall members, i.e., housing, to assure that the forage material is contained and directed through the apparatus as it enters as whole or at least relatively large pieces, passes therethrough and exits as a chopped feed product. The forage harvester can be fitted with wheels for portable use in a field on a growing crop or can be mounted as a stationary apparatus.

The forage harvesters themselves usually are of three main types, drawn, self-propelled, or stationary.

The drawn type of harvester ordinarily is designed to be towed by a tractor and the chopping unit is driven by power derived from the tractor or by a separate power unit through power take-off assemblies, pulleys, belts, sprockets, chains or other transmission means. This power drive for the chopper unit provides the added advantage of positive and variable operating speeds and variable ground speeds. A combination of these drive means also can be employed to operate the various interrelated assemblies of the harvester.

The self-propelled harvester in operation is much like the drawn model described directly hereinbefore except that the power for both movement over the terrain and for operation of the cutting and chopping mechanism of the harvester is provided from an engine and drive assembly integral to the unit itself.

Stationary forage harvesters in their cutting and chopping operation utilize the same general mechanism and assemblies as described above except these are usually mounted or positioned at a given location. Here the drive power means can be self-contained or derived from a secondary supply source, e.g., electric motor driving a gear train, pulley and belt or sprocket and chain drive. This type of unit commonly is employed where it is of interest to transport the forage material to a storage area or feed lot, for example, in a location somewhat removed from the supply of forage feedstock or where quantities of feed stock are purchased or derived from a plurality of sources.

In operation each of the above forage harvesters operates in much the same way. The forage feedstock is gathered, drawn or otherwise fed into the throat of the entrance conduit or chute; it is forced by the conveyor or feed rolls toward the fixed cutter bar where it comes into contact with the blades of the rotating reel or flywheel cutter, thereby being chopped and sliced. (The fixed cutter blade-rotating reel assembly both in design and operation can be linked to a reel-type lawn mower and the flywheel type cutter is similar to a rotary lawn mower.) The only difference between the stationary harvestr and the portable harvester is that the stationary harvester does not need to use a gathering means as a pre-cut stalk of corn or other forage material is fed directly to the chute.

The chopped forage of non-uniform size and having a large amount both of fine and course large chunks is passed through and around the cutter reel or flywheel and exits either directly from the exit port of the harvester or after being passed through a screen positioned between the cutter assembly and the exit port.

As indicated hereinbefore, these forage harvesters are in widespread use and do provide a practical means for preparing forage materials. However, there are certain problems inherent in their design and operation which result in undesirable lower product output and reduced product uniformity than is desired. In operation, because of the design of the cutter bar-bladed reel assembly and screen, a large percentage of the product as cut does not exit from the machine in a rapid manner. Rather, this material remains within the reel or in the vicinity of the reel and its housing being held up for a period of time in recycle. My observations and experiences have shown that only a relatively small proportion of the product promptly exits from the harvester, the remainder being held up. Further, the lack of uniformity of the product with respect to particle size is undesirable in formulating animal feeds. The use of the screen helps in this respect but as mentioned hereinbefore sharply increases the power requirements for operation and greatly reduces overall capacity of the harvester. In attempts to provide for more efficient operation, manufacturers have tended to increase the total operating horsepower to achieve faster throughput of a more uniform product but this has not proven to be completely successful.

Now, unexpectedly, I have found a novel and useful improved apparatus for use either alone or in combination with conventional harvesters which provides for markedly increased total operating efficiency.

It is an object of the present invention to provide an improved unit for use in combination with a forage harvester which provides for increased throughput of a uniform particle size forage product at low total power requirements.

It is also an object of the present invention to provide an assembly for use in combination with existing forage harvesters to upgrade and improve their operation.

It is a further object of the present invention to provide a unit for ready removable attachment or fixed attachment to forage harvesters which unit itself offers versatility in adjustment and assembly so as to provide for optimum particulation of relatively homogenous particles from a wide variety of forage feedstocks.

These and other objects and advantages of the apparatus of the present invention readily will become apparent from the detailed description presented hereinafter when read in conjunction with the Figures of the drawing.

GENERAL DESCRIPTION OF THE INVENTION

In general, the present improved particulator which is suitable for use with forage harvesters comprises in combination a cylindrically shaped member fitted with a plurality of spaced apart outwardly directed projections. The cylinder or drum is rotatable about a center axle or shaft, which usually serves as the drive shaft for rotating said cylindrically shaped member. At least one solid arcuate member is positioned adjacent the extremity of the projections, this arcuate member having a radius of curvature corresponding to that of the cylinder. The arcuate member is connected in the unit in such a manner that it can be moved inwardly and outwardly with respect to its position with the drum but can be fastenable at a predetermined spot within the extremities of this range of movement. It also is positioned so that it does not restrict the rotation of the cylindrical member. The unit also contains a drive means for rotating the cylindrical member during operation, a connector means for attachment of the unit to the rear of the housing of the cutter unit of the forage harvester which provides a conduit or passage for direct communication therewith and serves as an entry port to the particulator, a housing surrounding said cylindrical member at least over those portions not covered by said arcuate member, and a discharge port rearward of said entry port.

Ordinarily the cylindrical member consists of an open framework or closed unit having a number of the outwardly extending projections, hereinafter referred to as teeth, positioned at spaced apart intervals around the external periphery of its curved wall. This unit will be called a spike drum at times hereinafter. For most effective operation usually the teeth are in rows extending the length of the cylinder and preferably a plurality of rows of teeth are present. Each row will extend substantially from end to end of the cylinder and from about four to about 16 rows, usually from about six to about 12 rows, and preferably from about six to about 10 rows of teeth will be positioned about the periphery of the drum wall. Although it is not critical to the operation of the present invention, for optimum in effectiveness the rows will be spaced about equal distances apart. Within a given row the teeth will be positioned from about 0.5 inch to about 6 inches apart, ordinarily from about 0.75 to about 4 inches apart and preferably from about 1 to about 3 inches apart. Here again, it is not critical that the teeth in a given row be spaced at equal distances apart although for optimum effectiveness and cooperation with the arcuate member usually they are placed so that there are about equal distances between teeth.

For use in most forage particulation operations, the drum diameter, including length of teeth, will be from about 14 to about 30 inches, usually from about 18 to about 26 inches and commonly about 22 inches. In length the drum will range from about 18 to about 60 inches, usually from about 24 to about 48 inches, and commonly about 30 inches.

As indicated hereinbefore the spike drum can have a solid curved wall or can be composed of an open framework having rows of spikes or teeth mounted thereon by means of lateral support bars. The open frame embodiment is preferred as this configuration provides for ready ease of fabrication and maintenance, particularly for replacing teeth as these become worn and/or damaged during operation.

The teeth can be permanently attached to the drum member as by welding, but preferably are removably fastened thereto to permit both the interchange of teeth of various geometrical configurations and size for specific forage particulation operations and for the ready replacement of worn or damaged teeth. From a practical standpoint, for most units, the teeth will be fitted with a fully or partially threaded shank. The threads of this shank can mate with threads in a bore on the cylinder or the cylindrical frame or particularly in the case of the open frame configuration can be simply passed through a smooth bore of appropriate size in the frame and be held in place by lock washers and tap assemblies, for example.

The teeth range from about 1.5 inches to about 4 inches in length, excluding shank, and usually are from about 2 to about 3 inches long. If they are much longer than the maximum indicated they are more easily deformed or damaged during use. If they are much shorter, they become less efficient.

The teeth can be of any of a variety of shapes. It is essential only that the forward edge or face or sides which initially contact the forage during operation have at least one sharp cutting edge. Preferably, this contact surface contains one or two cutting edges. Representative operable teeth configurations include, for example, triangular, square, rectangular or other polygonal cross-sectioned members. A thin wedge shaped tooth wherein the side walls taper inwardly from bottom to top is a preferred configuration. A further preferred design provides for protruding rasp-like points, angled, sharp edged ridges, grooves or other cutting members on the side walls of the teeth. These aid in grinding and cutting as the forage passes by the teeth during operation of the particulator. Each tooth has a notch in its outer tip, the lower portion of the notch being at the forward edge of the tooth.

The arcuate member employed in combination with the spike drum at a maximum extends about 180° and ordinarily defines an arc ranging from about 20° to about 150°, and for most forage harvesting operations has a curvature of about 90°. This member can be a single unit or, preferably is comprised of a plurality of segments each defining an arc ranging from about 10° to about 20°. In length the arcuate member is about equal to that of the spike drum.

This member can contain a number of teeth of design as described hereinbefore over its inner curved surface positioned so as to mesh freely with the teeth of the spike drum in an assembled unit. Ordinarily, the teeth are removably attached to the arcuate member in spaced apart rows extending along the length of the member. Usually this member has two or more rows of teeth and ordinarily from two to four rows. The actual spacing of the teeth in a given row is such that these provide for a distance of from about one-sixteenth to about three-eighths inch clearance, preferably from about one-eighth to about one-fourth inch clearance, between the sides of the teeth of the arcuate member and those of the spike drum during rotation.

Preferably, between at least the first two rows of teeth of the uppermost segment of the arcuate member is a tapered bar having sharp-edged angled grooves and ridges across its top from the front to back of the bar. The bar itself, hereinafter referred to as a rasp bar, usually extends across the length of the segment. Ordinarily, there is a rasp-bar between each two rows of teeth in the segments of the arcuate member. When more than one bar is used, these are fabricated so that the angled file-like grooves and ridges in a given bar are tapered at an angle across the bar in the opposite direction from that of the preceeding and succeeding bar in adjacent segments.

In an assembled unit, the arcuate member, or a plurality of segments which make up this member, are mounted in relation to a spike drum such that the minimum distance between the ends of the spikes on the drum and the inner surface of the arcuate member or the maximum height of the rasp-bar affixed thereto if such is used, is about one-sixteenth inch. At a maximum distance apart these members are placed such that the ends of the teeth in the spike drum and those in the arcuate member do not overlap. For most operations, the arcuate member is positioned so that the ends of the teeth of the spike drum are from about one-eighth inch to about one-half inch away from the maximum height of the top surface of the rasp-bars mounted on arcuate member.

The arcuate member as mounted in the present unit can be moved inwardly and outwardly with respect to the spike drum within the limits disclosed directly hereinbefore and then can be secured at any given position within this range. This helps in regulating the fineness of the cut of the forage material during processing as well as enables the unit to be used with a number of different forage feed materials as will be shown hereinafter.

For many operations the inner surface of the arcuate member may have teeth along its entire inner surface; generally, however this member will comprise a mixture of non-tooth containing sections and sections fitted with teeth. The use of segments wherein certain of these members have no teeth and others have spaced apart teeth as set forth above gives a versatility in this regard.

DESCRIPTION OF PREFERRED EMBODIMENTS

Figures 1, 2:
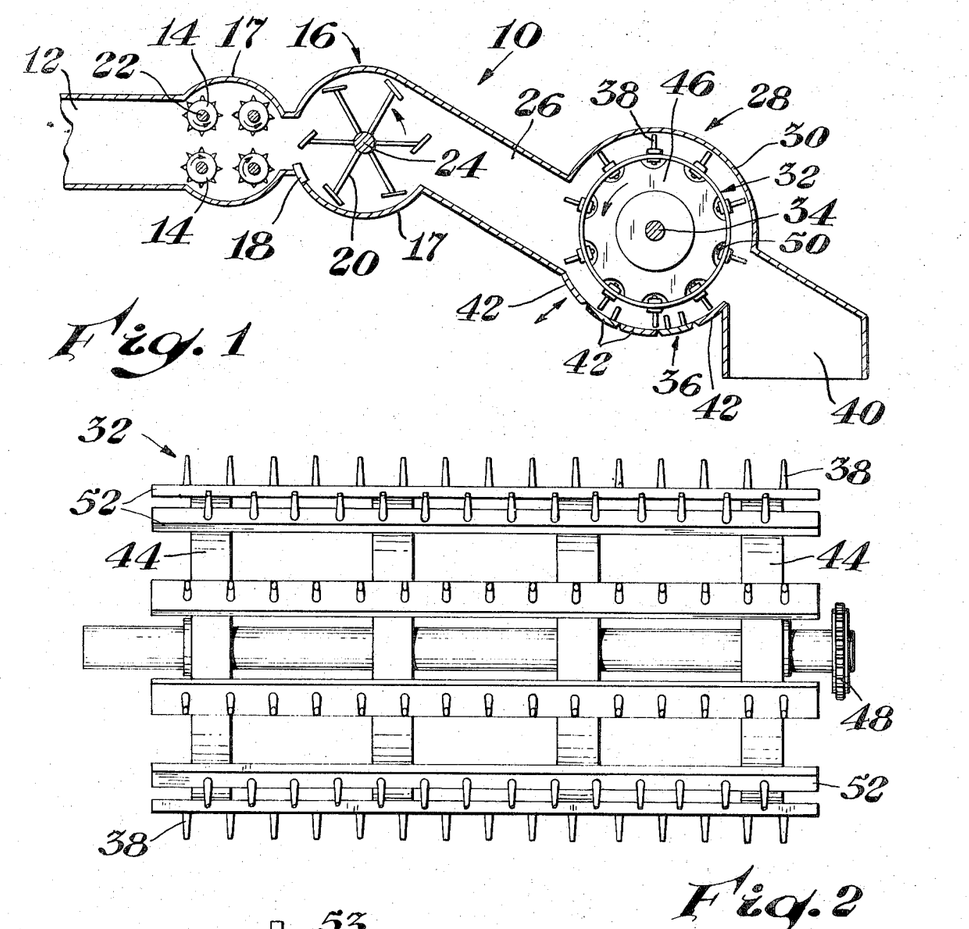
FIG. 1 is a schematic cutaway side elevation of a forage harvester having in combination therewith the improved particulation apparatus of the present invention.
FIG. 2 is a front view of a preferred embodiment of a spike drum member of the present invention.

FIG. 1 presents a cutaway side elevation of a conventional forage harvester 10 having in combination therewith the improved particulating apparatus of the present invention. This harvester 10 consists of a feed gathering means (not shown) and a feed chute 12 communicating with a feed roll system comprising a tandem array of two pairs of vertical rollers 14. The feed roll system of rollers 14 in turn communicates with the chopping unit 16. These units are enclosed in a housing 17. The chopper 16 consists of a fixed cutter bar 18 and rotatable reel type cutter blade assembly 20 cooperating therewith. Both the feed rolls 14 and cutter blade reel 20 are power driven by a conventional power source (not shown) so as to rotate during operation in the directions shown by the arrows around center shafts of axles 22 and 24 respectively. The power source for the rolls 14 and reel 20 in conventional forage harvesters have been described fully hereinbefore.

The housing 17 at the rear of the cutter reel 20 communicates with a chute 26 which in turn serves as a feed trough for the present improved particulation apparatus 28. The chute 26 is connected at the front of apparatus 28 to the housing 30 of this unit and defines an entry port thereto. Conveniently as shown, the chute 26 extends downwardly to take advantage of the added benefit of gravity in feeding forage feedstock from the chopping unit 16 to the particulating apparatus 28. Alternatively, the housing 30 can be placed so that its chute 26 angles upwardly. In such an embodiment the spike drum 32 would be located upwardly from cutter reel 20 and would be rotated in the opposite direction from that shown for the embodiment of FIG. 1. The arcuate member 36 would be positioned on the upward side of drum 32 with teeth pointed in the opposite direction of that shown in FIG. 1. Hence, during operation, forage would pass over the top of drum 32.

The particulating unit 28 consists of a spike drum 32, rotating about its center shaft 34 in the direction shown by the arrow. The drum 32 is driven by a conventional power supply (not shown) of the type described hereinbefore. Conveniently all of the rotating members are connected in series and operated from a single power unit. In a particularly preferred unit, the cutter assembly 20 is driven directly by a gear box on the power unit or power take-off shaft. Feed rolls 14 are driven by sprockets and chains from another gear box mounted on one end of cutter reel shaft 24. In turn this shaft 24, at its opposite end is connected through a belt drive means or gear drive, for example, to the shaft 34 of spike drum 32. Both of these units derive their initial power from a similar drive means connecting the power take-off of a tractor or other engine or motor actuating the shaft 24 of cutter reel 20.

The drum 32 is placed in the unit so that it can freely rotate with respect to the arcuate member 36 which also in the depicted embodiment serves as the bottom cover of housing 30 of the particulator 28. The teeth 38 in the drum 32 and those in the arcuate member 36 are staggered with respect to each other such that these do not make contact as the drum 32 rotates during operation. Rearward of the drum 32 of the housing 30 forms or communicates with an exit port 40.

The arcuate member 36 usually is comprised of a plurality of segments 42 which are fitted with removable teeth 38. The inner wall of the segments 42 of arcuate member 36 between each two rows of teeth is fitted with a removable tapered bar 76, i.e., rasp-bar, which extends substantially across the width of the segment from edge to edge. The upper surface of each bar has angled raised ridges sharp edges 78, such as are present in a coarse file, extending on an angle across its face from front to back. When positioned in an arcuate member 42, on adjacent bars 76 between each two rows of teeth, the ridges 78 are tapered in alternating opposite directions. Further, as is clearly shown in FIGS. 13 and 14, the front of each rasp bar 76 gradually tapers upward while the rear end of each bar drops off sharply from the top to bottom.

Figure 3:
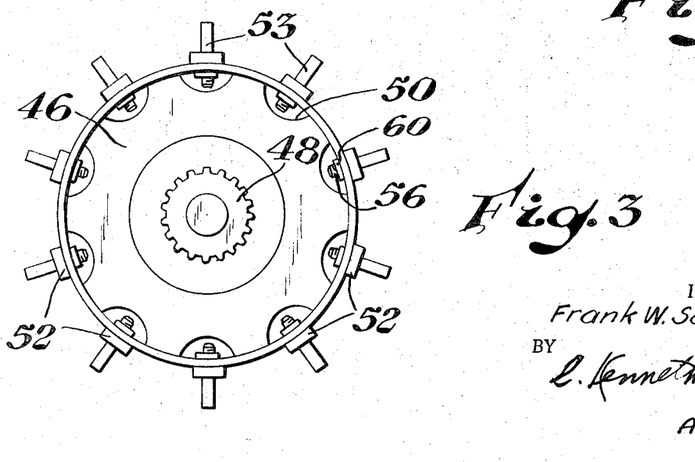
FIG. 3 is an end view of the spike drum of FIG. 2.

A preferred embodiment of spike drum 32 of the present apparatus is depicted in FIGS. 2 and 3. This member 32 consists of a plurality of spaced apart rings or bands 44 which in essence define the diameter, excluding teeth, of the drum 32. Each of the rings 44 is fastened to a solid support disc 46 which in turn has a rigid solid center shaft 34 passing therethrough. The shaft 34 extends outwardly a short distance on both ends beyond the end discs 46. This shaft 34 usually has a gear, sprocket or pulley 48 attached to one end. The discs 46 have a plurality of scalloped recessed sections 50 which correspond to the placement of support bars 52 on the bands 44. Each of the support bars 52 has teeth 38 removably attached thereto at regularly spaced apart intervals along its length.

The bars 52 usually are permanently bonded to the rings 44 and to turned up sections from the scallops 50 as by welding or rivets, for example, so as to be at right angles to the bands 44 thereby defining the effective length of the cylindrical member 32. Conveniently as shown with a drum of about 22 inches diameter four bands 44 equally spaced apart are used and ten bars equally spaced apart around their periphery are fastened thereto. The bars 52 usually extend for a distance of one inch or more beyond the outer edge of the two end most bands 44.

The scalloped portion 50 in discs 46 provides for ready access to the securing mechanism holding the teeth 38 positioned at about this site on the bar 52.

Figures 15, 16:
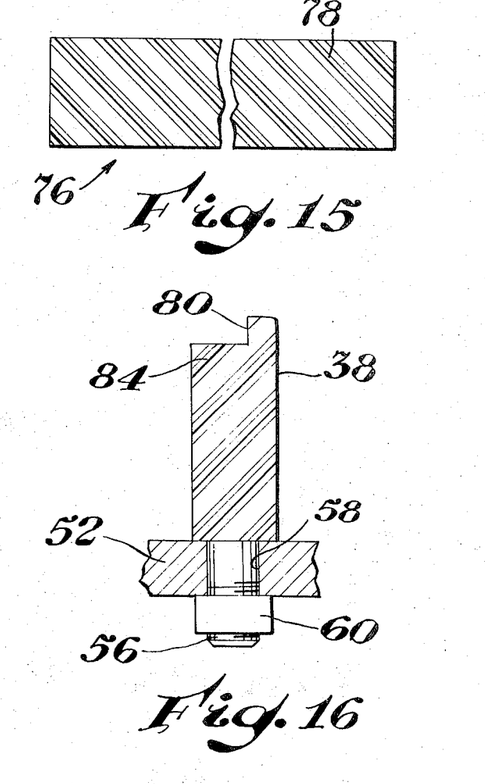
FIG. 15 is a top view of the rasp bar of the preferred embodiment of segment of FIGS. 13 and 14.
FIG. 16 is a side view of a preferred embodiment of a tooth of the present invention.
Figure 17:
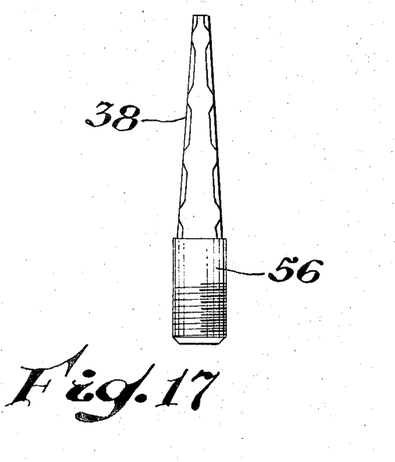
FIG. 17 is a front view of the tooth of FIG. 16.
Figure 18:
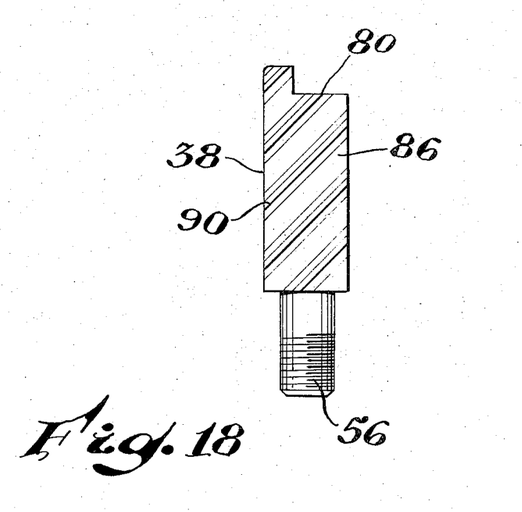
FIG. 18 is a side view of the opposite side of the tooth of FIG. 16.

Each tooth 38 consists of a tapered chisel-like blade member 53. The forward face 54 forms a sharp edge at its junction with the sides 55. Preferably, as shown in FIGS. 16, 17, and 18, the outer tip of each tooth has an angled notch 80, the forward portion of the notch being lower than at the rear of the tooth. Preferably the sides of the notch form approximately a right angle or obtuse angle. Ordinarily the notch is from about one-eighth inch to about one-fourth inch in depth and preferably is about three-sixteenths inch deep. The teeth 38 are placed on bars 52 so that the sides 55 are substantially parallel to the rings 44. Preferably as shown in FIG. 13, 14, 16, and 18 the opposite side faces 84 and 86 of the teeth 38 have along the length of the tooth angled raised sharp edged ridges 88 and 90 respectively, of a texture such as are found in a coarse file. These are positioned such that the ridges 88 on the side 84 of the teeth 38 taper upwardly from front to back while those ridges 90 on the other side 86 taper upwardly from back to front.

Figure 4:
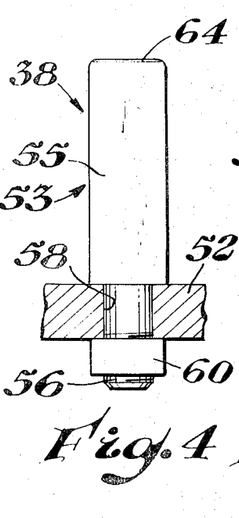
FIG. 4 is a fragmentary side elevation of one of the teeth members in position in the spike drum of FIG. 2.
Figure 5:
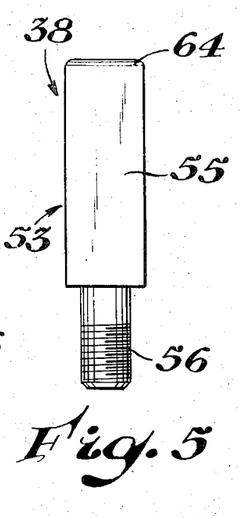
FIG. 5 is a side view of the tooth member of FIG. 4.
Figure 6:
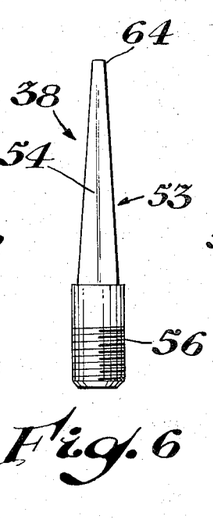
FIG. 6 is a front view of the tooth member of FIG. 4.
Figure 7:
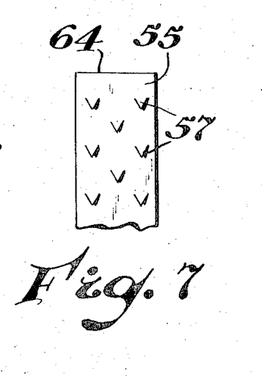
FIG. 7 is a fragmentary side view of another embodiment of tooth for use in the present particulating apparatus.

For ease in servicing and replacement of teeth 38 in this preferred embodiment the lower portion of each tooth 38 has a threaded shank 56 forming its base. This passes through a smooth bore 58 in the bar 52 being secured to the bar 52 by a nut 60 screwed onto shank 56 on the underside of the bar 52. For optimum assurance against undesired twisting or loosening during operation, lock washers or other tension or spring-like retainers usually are also used in this assembly.

The shank 56 can be polyaganol, e.g., square or rectangular in shape and slidably engage a mating bore 58 in bar 52 thereby giving additional assurance that the tooth 38 does not twist out of alignment during operation.

The presently depicted tapered chisel-like tooth 38 with ridges on its sides is a preferred shape.

Figures 8, 9, 10, 11, 12:
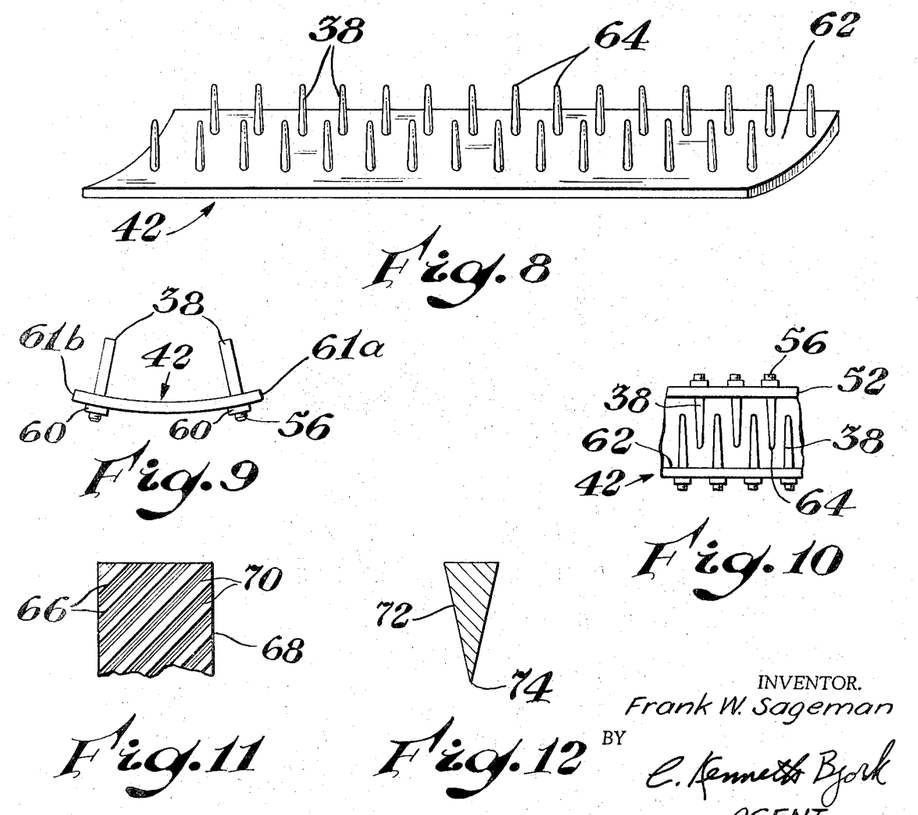
FIG. 8 is a perspective view of a segment of the arcuate member of the apparatus of the present invention.
FIG. 9 is an end view of the segment of FIG. 8.
FIG. 10 is a fragmentary sectional view showing an operating spatial relationship of the spike drum and arcuate member in an assembled unit.
FIG. 11 is a fragmentary side view of another tooth configuration of the apparatus of the present invention.
FIG. 12 is a cross-sectional view of an additional tooth design of the apparatus of the present invention.
Figures 13, 14:
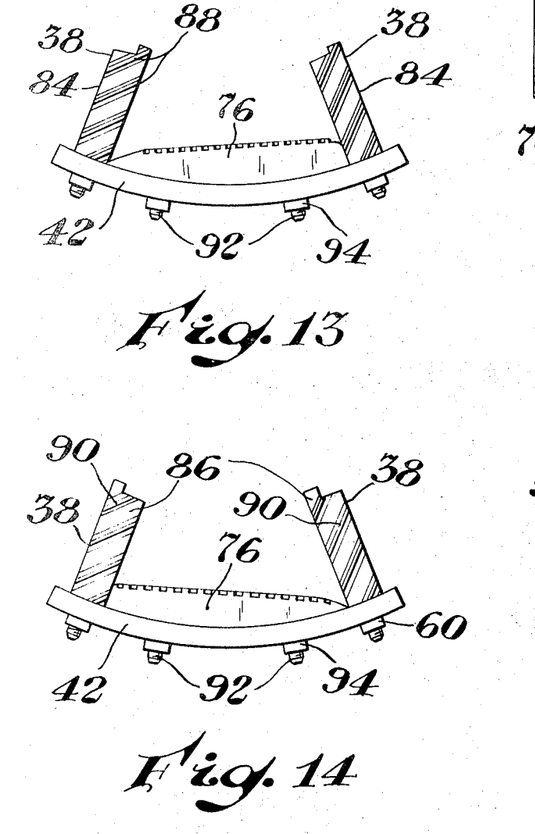
FIG. 13 is an end view of a preferred embodiment of a segment of the arcuate member of the apparatus of the present invention.
FIG. 14 is an end view from the opposite end of the segment of FIG. 13.

The arcuate member 36 in a most preferred embodiment is comprised of a plurality of segments 42 each having a total curvature of from about 10° to 20° from side to side as depicted in FIG. 8. In length a segment 42 is about equal to the length of the drum. As shown in FIGS. 13 and 14, the member 42 has two rows of spaced apart chisel-like teeth 38 having the notch 80 and raised tapered ridges 88 and 90 on opposite sides 84 and 86 respectively as described hereinbefore for the drum 32. Each row runs lengthwise of the segment 42 and each row is positioned near each of the sides 61a–61b of the segment 42. The teeth 38 are positioned in a row so as to be staggered with respect to the teeth 38 in the other row. The teeth 38 in each row are placed so that the leading face 54 of each tooth faces the corresponding leading faces 54 of the teeth 38 in the drum 32 and the tapered ridge-containing sides 84 and 86 of the teeth 38 in the spike drum 32 and the segments 42 are parallel but spaced apart as defined before so that these mesh without touching as the drum rotates as shown in FIG. 10. In an assembled unit, the tapered sides 84 and 86 of adjacent teeth on the arcuate member 42 and on the drum 32 which mesh during use have their sharp-edged ridges 88 and 90 tapering in opposite directions. In an assembled particulator unit, the ridges on facing sides of the adjacent teeth which mesh are tapered such that during operation a feed particle is being thrown upward and downward toward the tips of the teeth and on toward the next row of teeth closer to the discharge port.

Between the two rows of teeth is fastened a rasp-bar 76, as described hereinbefore. Usually this bar 76 has a plurality of threaded shanks 92 which pass through mating openings in the arcuate member 42. The rasp-bar 76 is held in place by nuts 94 which mate with the threaded shanks 92.

In fabricating the arcuate member 36 from a plurality of segments 42 a predetermined number of the segments 42 are placed together side by side to produce the arcuate member 36 having a predetermined number of degrees of total curvature. The segments 42 usually are mounted on a bracket attached to the frame or housing 30 of the particulator so as to be fastened at a given position but also to assure universal lateral adjustment inwardly and outwardly within the range set forth herein as desired or required for a given forage harvesting operation to vary the distance between the inner wall 62 of segment 42 and the tip or outer edge 64 of each tooth 38 of drum 32.

Figure 19:
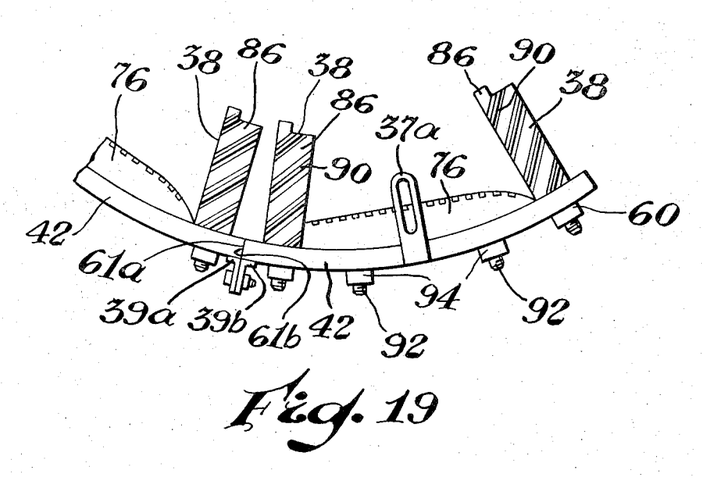
FIG. 19 is a fragmentary end view of a preferred embodiment of two segments of the arcuate member of the apparatus of the present invention showing the lateral adjustment lug and segment fastening lugs.
Figure 20:
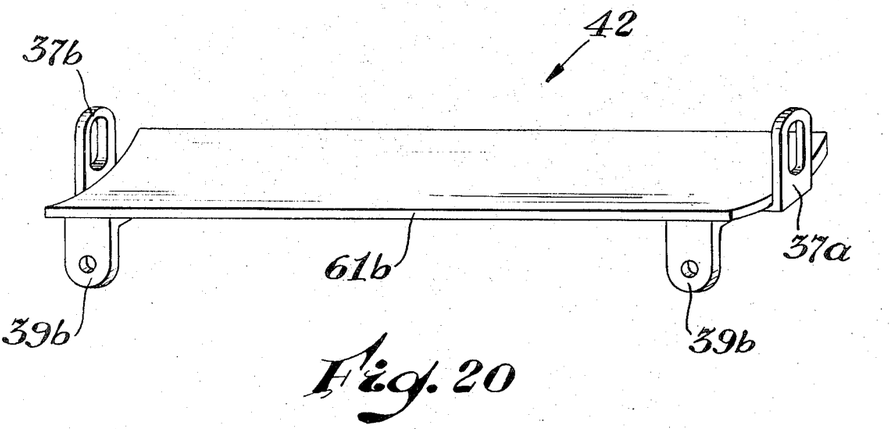
FIG. 20 is a fragmentary perspective view of the end segment of the arcuate member of FIG. 19 with teeth and rasp-bar not shown.

Each of the individual segments 42 forming the two end components of arcuate member 36 can be fitted with slotted lugs 37a–37b on their ends for connection through a bolt and nut assembly or other fastening means to a support member on the frame of the particulator 28 or the shaft 34, for example, to achieve the controlled lateral inward and outward movement of the member 36. Each of the segments 42 can contain L-shaped lugs 39a–39b on their outer wall at the side edges 61a–61b near either end. The lugs 39a–39b on two adjacent segments 42 can be clamped, bolted or otherwise fastened together to connect a plurality of the segments 42 together to form the arcuate member 36. As long as there is a stop means at the rear of the housing for the rear most segment, or the rear side of a single arcuate member to butt against, no fastening means is required to hold these in place as during operation when the movement of the feed therethrough gives sufficient force to secure these in position. For such an assembly the ends of the curved segments 42 or arcuate member 36 can fit into a securing trough or frame.

Ordinarily the teeth 38 in the spike drum 32 and those in the arcuate member 36, or segments 42 comprising this member 36, are of the same configuration. However, if desired these can be of different configurations. Also, the teeth in a given member can differ from row to row or position to position in a given member.

Other preferred teeth configurations as shown in FIGS. 11 and 12 possess the essential characteristic of providing a sharp edged cutting surface to sides, face and forward edge respectively. FIG. 11 shows a fragmentary side elevation of a tooth having projections 66. In this embodiment the side faces 68 have diagonal sharp thin projections 66 extending across their surface and grooves 70 between each projection 66. The triangular cross-sectional tooth 72 of FIG. 12 has a sharp leading edge 74. Other configurations of teeth also are preferred in some instances. For example, the tapered chisel-like tooth 38 described hereinbefore can be slanted or hooked as viewed from the side or can be triangular in cross-section with the apex of the triangle serving as the leading edge of the tooth.

The various components of the particulation apparatus of the present invention are fabricated from conventional high strength metals and alloys commonly used in machinery and similar implements. Ferrous based steels and other steels commonly are employed. It is apparent that the materials of construction used in the teeth should be of high strength and possess the requisite hardness properties to take and hold a sharp edge.

In use the present apparatus is operated so that the cylinder shaft rotates at from about 1,400 to about 2,400 revolutions per minute, preferably about 1,800 revolutions per minute.

In a representative forage preparing operation, the apparatus of the preferred embodiment described directly hereinbefore and having a diameter of about 22 inches and length of about 30 inches is attached through a chute to the discharge port of a self-propelled forage harvester. The particulator is mounted rearward and a little below the cutter reel. No screen is inserted in the unit between the cutter of the harvester and the chute leading to the present particulator. The drive for the spike drum is taken directly from the rotating shaft of the reel type cutter of the harvester through a series of belts or a belt drive train. Preferably the belt drive means on the reel-cutter and the spike drum in this drive train are mounted on opposite sides of the shaft from that on the cutter which has the drive means to the cutter. This minimizes torque and strain on the assembly.

With the rasp-bar 76 being gradually tapered upward at its front end, feed readily moves over the bar and comes in contact with the angled ridges on top of the bar. With the file-like ridges being at an angle across the bar, they are effective in particulating the feed while being self-cleaning. Further, power requirements are minimized. Since the ridges in the bars are angled in alternating opposite directions from each preceeding bar, this serves to produce a particulating effect in itself. Also, since the bar is tapered upwardly from front to back, the feed has a tendency to move upwardly into contact with the ridged sidewalls of the teeth in both the cylinder and the arcuate member, i.e., concave. With the configuration of the upwardly angled ridges on the facing sides of adjacent meshing teeth in the spike cylinder and the concave, the feed is further particulated and thrown upwardly and outwardly by centrifugal force from the high speed of cylinder rotation toward the tips of the teeth and moved between the teeth to the next rows of teeth for further particulating. This action is continued on through the unit until the predetermined desired feed particle size is obtained and then on to the discharge port. The notches in the tips of the cylinder teeth and concave teeth serve to move the larger pieces of feed on to the next rasp bar and rows of teeth for further particulating action. Thus it is apparent that the ridge containing rasp-bar, angular ridged teeth sides and notches in the teeth as employed in combination in the present improvement in feed particulators provide the optimum in efficiency of particulation with minimum power requirements.

For forage harvesting of green standing corn, i.e., silage, ordinarily from one to three teeth containing segments are used, these being sufficient to provide the desired uniform particulation of feed product when chopped and sliced material is fed to the particulator from the cutter assembly of the harvester. The remainder of the segments which complete the arcuate member do not have any teeth. There is no criticality of positioning of these segments with respect to the side by side relationship of teeth containing and non-teeth containing segments. For use with this type of forage the arcuate member is positioned to provide a clearance of about one-eighth to about one-half inch between the tips of the drum teeth and the inner wall of this member.

In operation the harvester unit is propelled at a speed of from about 3 to 5 miles per hour. Three to four rows of standing corn are harvested at one time. The chopped corn comprised of a mixture of particles ranging up to about 2 inches in size is fed from the cutter assembly directly to the particulator. This feed material passes freely and rapidly there-through being ground in the process and exiting therefrom as relatively uniformly sized particles of texture about like sawdust. All stalks, corn kernels and cobs are particulated with no large particles being present. This forage feed product is of a size particulation and texture desired for direct use as an animal feed or for blending with other feed supplement and nutrient components.

In other operations for preparing forage feed from wilted alfalfa, a plurality of toothed segments are used to make up the arcuate member, these covering substantially the entire length of the curved inner wall of this member. With such a unit the resulting forage product can have a texture similar to that of the green corn described above.

In the particulation of high moisture shelled and/or cob corn excellent results are realized using the same apparatus as described for the silage.

In preparing feed from mature cob corn, the arcuate member has the same plurality of tooth segments as for wilted alfalfa, and a screen as conventionally employed in a harvester may be inserted between the cutter assembly and the chute leading to the particulation apparatus of the present invention.

With dry hay and straw, excellent particulation with uniform product size can be realized when the arcuate member has no teeth but only a smooth inner wall surface.

It is to be understood that forage which has been previously chopped in a conventional harvester or by other means can be transported to a separate particulator of the present invention and subjected to a desired particulation operation. This provides for use of the present invention at positions remote from a standing forage crop.

I claim:

1. In a feed particulator apparatus comprising an entry port communicating with a cylinder, said cylinder fitted with a plurality of rows of spaced apart teeth positioned at intervals around the external periphery of its curved wall and each of said rows of spaced apart teeth extending substantially across the width of said cylinder, said cylinder being rotatable about a center shaft, said shaft serving as a drive shaft for said cylinder, a curved arcuate member positioned adjacent the extremity of said teeth on said cylinder, said arcuate member having a radius of curvature corresponding to that of said cylinder, said arcuate member being movable inwardly and outwardly with respect to said cylinder and positioned in relation to said cylinder such that it does not restrict rotation of said cylinder, said arcuate member being fastenable into a fixed position at any predetermined spot within the extremities of its range of inward and outward movement, said arcuate member fitted with at least two rows of spaced apart teeth each of said rows extending substantially along the length of the arcuate member, the teeth of said arcuate member meshing with the teeth of said cylinder, a drive means connected to said drive shaft, a housing surrounding said cylindrical member at least over those portions not covered by said arcuate member and a discharge port rearward of said entry port, the improvement which comprises; the teeth on said cylinder and said arcuate member being tapered chisel-like members, the forward face of each tooth forming a sharp edge at its junction with each of the sides, the outer tip of each tooth having an angled notch, the forward portion of each said notch being lower that that at the rear of said tooth, the opposite side faces of each of said teeth having angled raised sharp edged ridges, said ridges on both sides being tapered oppositely as viewed from the front of said tooth and a tapered bar mounted between each of said two rows of teeth in said arcuate member, said bar extending substantially across the length of the arcuate member from edge to edge, said bar tapering gradually upward from the front and dropping off sharply from top to bottom at its rear, and having angled, raised sharp-edged ridges across the top face of said bar from front to back.

2. The improved feed particulator apparatus as defined in claim 1 wherein said arcuate member defines an arc ranging from about 20° to about 150°.

3. The improved feed particulator apparatus as defined in claim 2 wherein the arcuate member is comprised of a plurality of segments each defining an arc ranging from about 10° to about 20°, each of said segments containing two rows of spaced apart teeth, a tapered bar mounted between each of said two rows of teeth, the sharp-edged angled grooves and ridges in the top of a given bar being tapered at an angle across the bar in the opposite direction from that of those in the bar of a preceeding and succeeding bar in adjacent segments.

4. The improved feed particulator apparatus as defined in claim 1 wherein the sides of the notch in the tip of each tooth form approximately a right angle and said notch ranges in depth from about one-eighth to about one-fourth inch.

5. The improved feed particulator apparatus as defined in claim 1 wherein the minimum distance between the cylinder and the arcuate member is such that the ends of the teeth on the drum and the maximum height of the said tapered bar is about one-sixteenth inch and at a maximum is such that the tips of the teeth of the cylinder and those of the arcuate member do not overlap.

6. The improved feed particulator apparatus as defined in claim 1 wherein the teeth of said cylinder and of said arcuate member are removably attached thereto.

7. The improved feed particulator apparatus as defined in claim 1 wherein each of the tapered bars is removably attached to said arcuate member.

8. The improved feed particulator apparatus as defined in claim 1 which is employed in combination with a portable forage harvester, said improved apparatus being mounted to the rear of the cutter unit of said forage harvester and communicating therewith.

* * * * *